United States Patent
Kelly et al.

(10) Patent No.: US 7,415,726 B2
(45) Date of Patent: Aug. 19, 2008

(54) CONTROLLING ACCESS TO SUSPICIOUS FILES

(75) Inventors: Nicholas Paul Kelly, Milton Keynes (GB); Lee Codel Lawson Tarbotton, Leicester (GB); Kevin Andrew Gudgion, Milton Keynes (GB)

(73) Assignee: McAfee, Inc., Santa Clara, CA (US)

( * ) Notice: Subject to any disclaimer, the term of this patent is extended or adjusted under 35 U.S.C. 154(b) by 1408 days.

(21) Appl. No.: 10/028,906

(22) Filed: Dec. 28, 2001

(65) Prior Publication Data

US 2003/0126449 A1 Jul. 3, 2003

(51) Int. Cl.
*G06F 11/30* (2006.01)
*G08B 23/00* (2006.01)

(52) U.S. Cl. .............. 726/24; 713/188; 707/1
(58) Field of Classification Search ........... 713/200, 713/165, 188; 726/24, 22
See application file for complete search history.

(56) References Cited

U.S. PATENT DOCUMENTS

| | | | | |
|---|---|---|---|---|
| 5,440,723 | A * | 8/1995 | Arnold et al. | 714/2 |
| 5,452,442 | A * | 9/1995 | Kephart | 714/38 |
| 6,272,641 | B1 * | 8/2001 | Ji | 713/201 |
| 6,401,210 | B1 * | 6/2002 | Templeton | 713/200 |
| 6,609,196 | B1 * | 8/2003 | Dickinson et al. | 713/154 |
| 6,711,583 | B2 * | 3/2004 | Chess et al. | 707/104.1 |
| 6,886,099 | B1 * | 4/2005 | Smithson et al. | 713/200 |

FOREIGN PATENT DOCUMENTS

| WO | WO 99/12307 | 3/1999 |
|---|---|---|
| WO | WO 00/70463 | 11/2000 |

* cited by examiner

*Primary Examiner*—Christian La Forgia
(74) *Attorney, Agent, or Firm*—Zilka-Kotab, PC; Christopher J. Hamaty

(57) ABSTRACT

The present invention provides a computer program product, method and data processing apparatus for reviewing files for potential malware. The computer program product comprises logging code operable to maintain a statistical log having an entry for each file sent for review, each entry being arranged to store a count value indicating the number of times that the file has been sent for review and a value of one or more predetermined attributes relating to the file. Weighting table code is also used to maintain a weighting table identifying, for each value of said one or more predetermined attributes, a weighting indicating the likelihood that a file having that value of the one or more predetermined attributes will be malware. The computer program product further comprises statistical log interface code operable, upon receipt of a file, to determine with reference to the statistical log the count value relating to that file, and action determination code operable, if the count value determined by the statistical log interface code exceeds a predetermined threshold, to reference the weighting table to determine the weighting to be associated with the file, based on the value of said one or more predetermined attributes associated with that file in the statistical log. Finally, action performing code is provided to perform predetermined actions in relation to the file depending on the weighting determined by the action determination code. It has been found that this technique is useful in identifying files that may potentially contain malware.

39 Claims, 7 Drawing Sheets

STATISTICAL LOG

| NAME | TYPE | COUNTER |
|---|---|---|
| FILE 1 | EXE | 22 |
| FILE 2 | DOC | 2 |
| FILE 3 | PDF | 5 |
| ⋮ | ⋮ | ⋮ |

FIGURE 6A

STATISTICAL LOG

| NAME | TYPE | SENDER | NUMBER OF OCCURENCES | COUNTER |
|---|---|---|---|---|
| FILE 1 | EXE | USER 1<br>USER 3<br>USER 4 | 12<br>3<br>7 | 24 |
| FILE 2 | DOC | USER 4<br>USER 12 | 1<br>1 | 2 |
| FILE 3 | PDF | USER 3<br>USER 5 | 1<br>4 | 5 |
| ⋮ | ⋮ | ⋮ | ⋮ | ⋮ |

FIGURE 6B

WEIGHTING TABLE

| FILE TYPE | WEIGHTING |
|---|---|
| EXE | 5 |
| BAT | 4 |
| VBS | 5 |
| COM | 4 |
| TXT | 1 |
| DOC | 3 |
| PDF | 1 |
| SCR | 2 |

FIGURE 7

CONTROLLING ACCESS TO SUSPICIOUS FILES

BACKGROUND OF THE INVENTION

1. Field of the Invention

The present invention relates to techniques for controlling access to suspicious files, and more particularly to a computer program product, method and data processing apparatus for reviewing files for potential malware. As will be appreciated by those skilled in the art, "malware" may include, amongst other things, viruses, worms, Trojans, and/or computer files, words, content, etc that are considered to be banned, etc.

2. Description of the Prior Art

It is often desirable to perform malware scanning of files, for example to seek to prevent the distribution of such malware within a computer network. Accordingly, appropriate scanning software has been written for installation within the computer network so as to enable files to be scanned at appropriate times, for example when they are written to a device within the computer network, read from such a device, etc. An example of such scanning software would be anti-virus (AV) software installed within the computer network to perform scanning of the files in order to determine whether they contain computer viruses.

Typically, the anti-virus scanner can be configured to determine when scanning is performed (e.g. when files are read, when files are written, both, etc), what type of files are scanned (all files, only executable files, files of a type in which a macro program may be embedded, compressed files, etc), and what type of scanning is performed. Currently, there are two general types of scanning that are performed. The first type of scanning involves the use of anti-virus algorithms that compare a suspect file to a dictionary of known virus characteristics, whilst the second type of scanning involves the use of heuristic algorithms that seek to detect virus-like activity associated with a file being scanned.

Regarding the first type of scanning, this is basically a "find/fix" technique. When a new virus is released into the public domain, anti-virus vendors have to obtain a sample of the virus code to be able to add detection routines into their anti-virus software, and then release a signature file that has to be loaded into the dictionary of known virus characteristics by each of the anti-virus vendor's customers. This means that anti-virus software of the first type is always "one step behind" the virus writers, and if a new virus is received by a user on a computer network, the virus can very rapidly spread out of control until the new signature file is developed by the anti-virus vendor.

Whilst the second type of scanning involving heuristic detection can provide some assistance in detecting new viruses, it would be desirable to provide an improved technique for detecting the presence of new viruses, or other types of malware, within a computer network.

Accordingly, it is an object of the present invention to provide an improved technique for detecting potential malware within a computer network.

SUMMARY OF THE INVENTION

Viewed from a first aspect, the present invention provides a computer program product for operating a computer to review files for potential malware, comprising: logging code operable to maintain a statistical log having an entry for each file sent to the computer for review, each entry being arranged to store a count value indicating the number of times that the file has been sent to the computer for review and a value of one or more predetermined attributes relating to the file; weighting table code operable to maintain a weighting table identifying, for each value of said one or more predetermined attributes, a weighting indicating the likelihood that a file having that value of said one or more predetermined attributes will be malware; statistical log interface code operable, upon receipt of a file, to determine with reference to the statistical log the count value relating to that file; action determination code operable, if the count value determined by the statistical log interface code exceeds a predetermined threshold, to reference the weighting table to determine the weighting to be associated with the file, based on the value of said one or more predetermined attributes associated with that file in the statistical log; and action performing code operable to perform predetermined actions in relation to the file dependent on the weighting determined by said action determination code.

The present invention provides a technique for detecting files which potentially might be malware by keeping track of the number of times that particular files are sent to a computer within the network that has been set up to review files for potential malware. Then when that number of times exceeds a predetermined threshold, reference is made to a weighting table used to identify the likelihood that that particular file will be malware so as to enable an appropriate action to be invoked.

The invention makes use of the fact that malware is typically spread by distribution of a file a large number of times. For example, taking the example of a virus, these are often contained within files which are widely distributed, for example via e-mail communications. Similarly, other types of malware, for example jokes, unauthorised screensavers, etc are also typically replicated by widespread e-mail distribution. When files are received by the computer network, for example via an incoming e-mail communication, those files will typically be sent to an installed malware scanning device, for example a computer set up to perform anti-virus scanning, prior to those files being stored within the network, for example on a file server. The computer program product of the present invention is preferably installed on that computer, so that it can keep track of the number of times that particular files are sent to that computer for malware scanning. By keeping track of the number of times that individual files are received by the computer for malware scanning, suspicious files that may be malware can be detected by identifying when a particular file is appearing a suspiciously large number of times.

However, it will be appreciated that there are perfectly legitimate reasons why a particular file might be distributed a large number of times within a short period of time, for example the minutes of a particular meeting may be distributed to a large number of people within an organization as a Word document. Accordingly, the present invention is also arranged to determine for each file a value of one or more predetermined attributes relating to that file, and to then store that value within a statistical log that is also keeping track of the count value indicating the number of times that that file has been sent to the computer for review. Further, a weighting table is provided which identifies, for each value of said one or more predetermined attributes, a weighting indicating the likelihood that a file having that value of said one or more predetermined attributes will be malware.

Accordingly, when a count value for a particular file is determined to have exceeded a predetermined threshold, the weighting table can be referenced to determine a weighting to be associated with that file given the corresponding value of the one or more predetermined attributes associated with that file. This weighting will then in turn be used to determine what action should be performed in relation to the file. For example, if the value of the predetermined attributes indicates that the file is very likely to be malware, a suitable action might be to encode the file, and to prevent access to the file until an administrator has had a chance to verify whether that file is in fact malware. Conversely, if the predetermined attributes indicate that the file is very unlikely to be malware, or at least harmful malware, it may be more appropriate to allow the file to continue to be distributed, but merely to draw the administrator's attention to the fact that this file is being distributed a large number of times.

The present invention hence allows files that could potentially be malware to be detected, and for appropriate action to then be invoked dependent on the perceived likelihood that that file may in fact be malware, thus improving the chances of detecting new malware, for example new viruses, before a specific detection routine for that new malware has been developed and distributed to customers.

In preferred embodiments, it is envisaged that the computer program product of the present invention would be installed on a computer that has already been set up to perform malware scanning, and that the technique of the present invention would be used in conjunction with pre-existing malware scanning techniques.

It will be appreciated that the one or more predetermined attributes relating to each file that are used to reference the weighting table may take a variety of forms. For example, those attributes might take the form of key words found within files, particular programming commands found within program files, etc. However, in preferred embodiments, the one or more predetermined attributes comprise an indication of the file type of the file. It has been found that categorizing files by file type provides a suitable granularity upon which to establish the weighting table, since certain types of malware will only be found in particular types of files, and certain types of malware are generally more harmful that others, and might require more stringent action to be taken.

One important type of malware is virus-infected files. Viruses are typically contained in files that can be executed on a computer, and there are only certain file types that may be executed on a computer, for example, ".exe", ".com", ".vbs", ".scr", etc. Other file types are benign and cannot contain executing virus code. Further, within the various file types that may contain virus code, widespread distribution of some file types is more likely to indicate the presence of a virus than others, and accordingly suitable weightings can be associated with each file type in the weighting table having regard to the likelihood that each file type might contain a virus. Further, other types of malware, such as banned files (for example jokes and other material that is deemed inappropriate for distribution within a particular computer network) are also likely to appear within files of particular file types, for example ".txt", ".jpg", etc, and such file types can also be given a weighting within the weighting table. As an example, such file types might be given a weighting which would cause less stringent actions to be invoked than might be invoked for file types that were potentially containing virus code.

It will be appreciated that the weighting scheme within the weighting table may take a variety of forms. In preferred embodiments, the weighting takes the form of a numerical value, and the action performing code is responsive to that weighting value to determine the appropriate action to perform. However, it will be appreciated that any other suitable encoding of the weighting, other than numerical values, could also be used within the weighting table.

In preferred embodiments, if the weighting indicates that the file is probably malware, said action performing code is operable to perform the steps of: encrypting the file such that only an administrator can decrypt that file; and generating for access by an administrator a notification identifying that the file has been encrypted. By this approach, when it is determined that the count value for a file that is likely to be malware has exceeded a predetermined threshold, then that file is encrypted to ensure that it is not inadvertently opened by anyone receiving that file, and the administrator is then notified to enable the administrator to perform some checks to determine whether the file is safe or not. If the file is later determined to be safe, then the administrator can decrypt the file to enable it to be accessed.

In preferred embodiments, in such scenarios, the action performing code is further operable to associate a message with the file for reference by a person receiving that file, the message identifying that the file has been encrypted. This ensures that the person receiving the file understands the problem, and preferably will direct that person to the administrator for further queries.

Preferably, if the weighting indicates that the file is possibly malware, said action performing code is operable to perform the steps of: encrypting the file such that only an administrator or the originator of the file can decrypt that file; and generating for access by an administrator a notification identifying that the file has been encrypted.

Hence, for files that might possibly be malware, for example for files that might be virus-infected, but whose weighting is not such as to indicate that the file will probably be malware, a similar encryption process is performed, but in preferred embodiments the encryption is such that both the administrator and the originator of the file can decrypt the file. Again, the administrator is notified of the encryption of the file.

Hence, considering the example of a file being distributed as an attachment to an e-mail, then if the weighting indicates that the file is possibly malware, it is in preferred embodiments deemed appropriate to delegate the responsibility for decrypting the file not only to the administrator but also to the originator of the file. Otherwise, the process is the same as that performed for files where the weighting value indicates that the file is probably malware, and again in preferred embodiments the action performing code is further operable to associate a message with the file for reference by a person receiving that file, the message identifying that the file has been encrypted. Preferably, such a message would identify to the receiver that either the administrator or the originator of the file should be approached in order to determine whether the file should be decrypted.

In situations where the weighting value indicates that the file may probably be malware, or may possibly be malware, then in one embodiment the action performing code could also be arranged to notify the person responsible for issuing the file, for example the sender of an e-mail containing the file, that the file has been encrypted.

In preferred embodiments, if the weighting indicates that the file is to be treated with caution, said action performing code is operable to perform the steps of: associating a warning message with the file for reference by a person receiving that file; and generating for access by an administrator a notification identifying the file. Typically, such a weighting would be used for file types which, whilst they could contain serious malware, for example virus code, are often perfectly legitimately widely distributed, and hence the presence of multiple occurrences of that file in the statistical log does not in itself indicate a significant risk. In such situations, files of those file types could be given a "caution" weighting, such that, whilst significant distribution of such files will not cause them to be encoded, a warning message will be provided to the person receiving the file, and again the administrator would be notified. It will be appreciated by those skilled in the art that the warning message could take a variety of forms, and could be tailored dependent on the actual file type. As an example, for a file of the file type ".doc", if it were decided to associate the "caution" weighting with such files, the message might draw the receiver's attention to the fact that files of this type may contain viruses, and that the user should only open the file if he/she is happy that that file has been received from a bona fide person, etc.

In preferred embodiments, a final weighting that is available for allocation to file types is a weighting of "safe", and if the weighting indicates that the file is safe, the action performing code is operable to generate for access by an administrator a notification identifying the file. In preferred embodiments, this weighting would be associated with file types that could not contain malware that could be a threat to the integrity of the computer system itself, and hence typically would be used to categorise file types that could not contain virus code, but which might contain other less severe types of malware, for example banned content. In this case, the administrator is notified, so that the administrator can look into the matter to ensure that banned content is not being distributed around the organization. There are various reasons why content can be deemed to be banned by an organization. For example, for moral reasons, it may be deemed inappropriate for certain types of material to be distributed within an organization. Additionally, when such material is being distributed very widely, it can actually impact the performance of the system itself, and this will typically be considered unacceptable.

In preferred embodiments, if it is determined that a file sent to the computer is not currently entered in the statistical log, the logging code is further operable to create an entry in the statistical log for the file, in which the value of said one or more predetermined attributes relating to the file are stored, and in which the count value is initialised. Preferably, the count value will be initialised to a value of one.

In preferred embodiments, upon receipt of a file, the statistical log interface code is operable to cause the count value within the relevant entry of the statistical log to be incremented to account for the current occurrence of the file. This step will preferably take place prior to the action determination code determining whether the count value exceeds a predetermined threshold, this ensuring that the current occurrence of the file is taken into account when performing that comparison with the predetermined threshold.

It will be appreciated that the computer program product of the present invention could be used to review files originating from a variety of sources, and hence for example could be used to detect when a particular file stored on the network is being read a significant number of times. However, in preferred embodiments, the computer program product is used to review files included in e-mail communications, as they are received and/or as they are issued, by users of the computer network. When the computer program product is used in this way, then in preferred embodiments each entry in the statistical log is further arranged to identify, for each sender of that file, the number of times that that sender has sent the file in addition to the count value indicating the total number of times that the file has been sent.

When a file has been included in e-mail communications a large number of times, this is more likely to be suspicious (i.e. the file is more likely to contain malware) if those e-mail communications have all been issued by a particular sender. Accordingly, in preferred embodiments, where the sender information is also tracked within the statistical log, then upon receipt of a file, the statistical log interface code is operable to cause the count value within the relevant entry of the statistical log to be incremented to account for the current occurrence of the file, and the number by which the count value is incremented is dependent on the number of times that the sender of the current occurrence of the file has previously sent that file. Hence, whilst the number of times that a particular file has been sent by any particular sender remains below a particular threshold, then any new occurrences of that file could cause the count value to be incremented by one, whereas if the number of times that file has been sent by a particular sender increases above that threshold, then the count value could be arranged to be incremented by a value greater than one, for example two, when further occurences from that sender are received, to reflect the increased risk that malware is present. Obviously by incrementing the count value by a value greater than one, then the quicker the count value will reach the predetermined threshold which causes predetermined actions to be taken in relation to the file dependent on the weighting associated with that file in the weighting table.

When using the techniques of preferred embodiments of the present invention, it will be appreciated that the administrator may face situations where they need to decrypt multiple occurrences of the same file once it has been determined that that particular file is safe. The determination as to whether the file is safe could be taken by the administrator based on tests that the administrator performs, skill and judgement, etc. Alternatively, the administrator might send the offending file to an appropriate third party, such as an anti-virus vendor, for tests to be performed, and only when the anti-virus vendor confirms that the file is safe, will the administrator take any steps to decrypt the file. Given that there will be situations where the administrator will need to decrypt multiple occurrences of the same file, then in preferred embodiments the computer program product further comprises: automated decryption code operable, if the file is subsequently determined to be safe, to perform the steps of: (i) locating all encrypted occurrences of that file on a file system; and (ii) decrypting each said occurrence.

Typically, all e-mails will be stored on a file system located within the computer network, and hence as an example if a large number of incoming e-mails all include a suspicious file which is then encrypted in accordance with the preferred embodiments of the present invention, the automated decryption code can be arranged to search the file system for all encrypted occurrences of that file, after which each occurrence can then be decrypted. This automated process will significantly reduce the workload of the administrator in decrypting files that have been encrypted in accordance with embodiments of the present invention.

Viewed from a second aspect, the present invention provides a method of operating a computer to review files for potential malware, comprising the steps of: (a) maintaining a statistical log having an entry for each file sent to the computer for review, each entry being arranged to store a count value indicating the number of times that the file has been sent to the computer for review and a value of one or more predetermined attributes relating to the file; (b) maintaining a weighting table identifying, for each value of said one or more predetermined attributes, a weighting indicating the likelihood that a file having that value of said one or more predetermined attributes will be malware; (c) upon receipt of a file, determining with reference to the statistical log the count value relating to that file; (d) if the count value determined at said step (c) exceeds a predetermined threshold, referencing the weighting table to determine the weighting to be associated with the file, based on the value of said one or more predetermined attributes associated with that file in the statistical log; and (e) performing predetermined actions in relation to the file dependent on the weighting determined at said step (d).

Viewed from a third aspect, the present invention provides a data processing apparatus for reviewing files for potential malware, comprising: logging logic operable to maintain a statistical log having an entry for each file sent to the computer for review, each entry being arranged to store a count value indicating the number of times that the file has been sent to the computer for review and a value of one or more predetermined attributes relating to the file; weighting table logic operable to maintain a weighting table identifying, for each value of said one or more predetermined attributes, a weighting indicating the likelihood that a file having that value of said one or more predetermined attributes will be malware; statistical log interface logic operable, upon receipt of a file, to determine with reference to the statistical log the count value relating to that file; action determination logic operable, if the count value determined by the statistical log interface logic exceeds a predetermined threshold, to reference the weighting table to determine the weighting to be associated with the file, based on the value of said one or more predetermined attributes associated with that file in the statistical log; and action performing logic operable to perform predetermined actions in relation to the file dependent on the weighting determined by said action determination logic.

BRIEF DESCRIPTION OF THE DRAWINGS

The present invention will be described further, by way of example only, with reference to embodiments thereof as illustrated in the accompanying drawings, in which:

FIGS. 6A and 6B are diagrams illustrating the format of the statistical log of FIG. 2 in alternative embodiments of the present invention; and FIG. 7 is a diagram illustrating the format of the weighting table of FIG. 2 in a preferred embodiment of the present invention.

DESCRIPTION OF A PREFERRED EMBODIMENT

Figure 1:
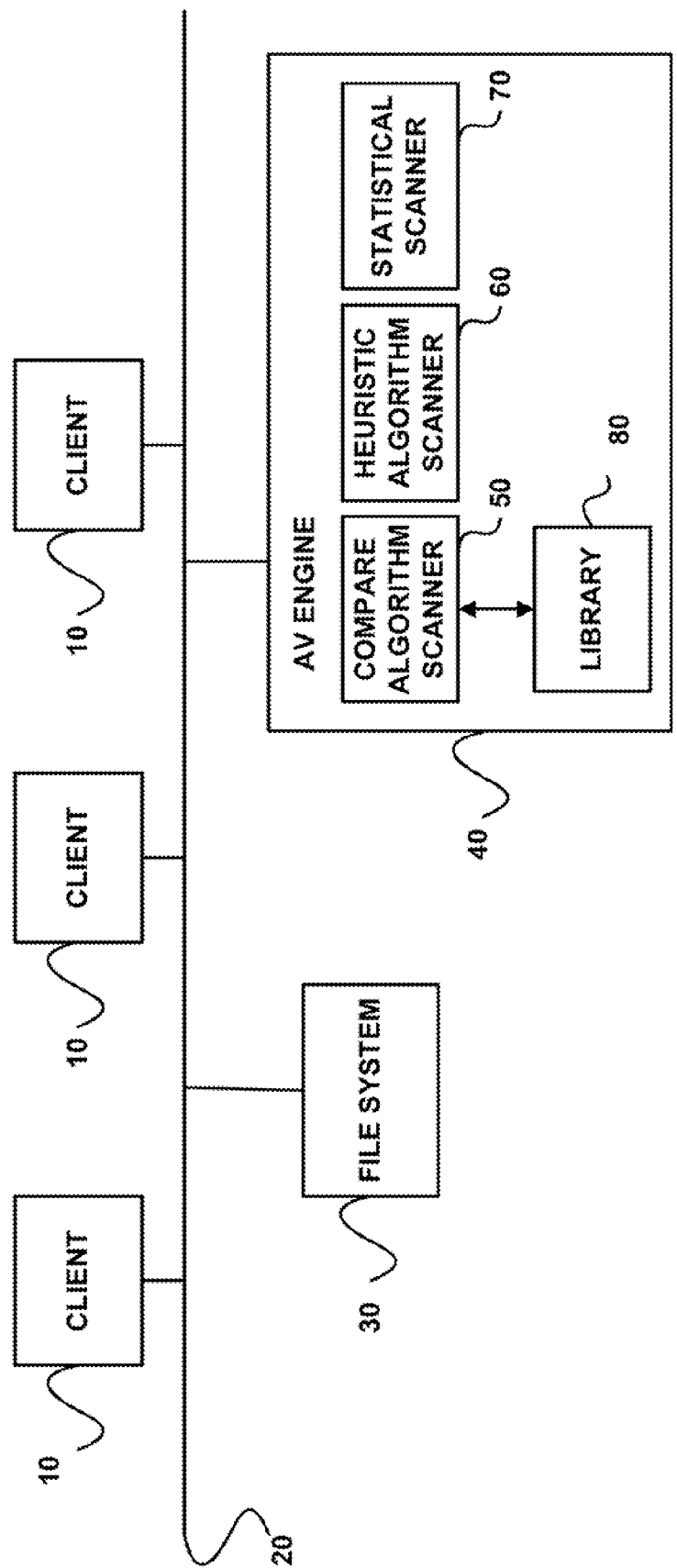
FIG. 1 is a block diagram illustrating a computer network in accordance with an embodiment of the present invention.

FIG. 1 is a block diagram of a computer network having an anti-virus (AV) engine 40 according to an embodiment of the present invention. As shown in FIG. 1, a number of client devices 10 (typically far more than the three client devices illustrated in FIG. 1) are connected via an appropriate communication infrastructure 20, for example a wired network, with a file system 30 and the AV engine 40. The AV engine 40 is arranged to perform anti-virus scanning (and/or other malware scanning) of files stored within the file system 30, either as those files are written to the file system 30, read from the file system 30, or both. The AV engine 40 includes a base comparison algorithm scanner 50 and base heuristic algorithm scanner 60. The base comparison algorithm scanner 50 is arranged to compare files to be scanned against a plurality of characteristics of known viruses stored within a library of virus definitions 80. Control parameters used to set up the configuration of the AV engine 40 will control which types of files are scanned, whether compressed files are decompressed prior to scanning, what type of heuristic behaviours are searched for by the heuristic algorithm scanner 60, and the like.

In accordance with preferred embodiments of the present invention, the AV engine 40 also includes a statistical scanner 70 which is used to review files for potential malware, and is preferably used in combination with the compare algorithm scanner 50 and heuristic algorithm scanner 60. Again, control parameters can be used to set up the configuration of the statistical scanner 70. In preferred embodiments the statistical scanner 70 is used to review files included within e-mail communications, for example as attachments to e-mails, or the e-mails themselves. All e-mail communications sent to users of the client devices 10 of the computer network, whether from other users within the network, or from external users, are stored within the file system 30, and those e-mail communications are preferably sent to the AV engine 40 for scanning prior to storage on the file system 30. Similarly, when the users of client devices 10 within the computer network generate e-mail communications, those e-mail communications are again stored within the file system 30, and are preferably sent to the AV engine 40 for scanning prior to storage within the file system 30. The statistical scanner 70 is used to analyse such e-mail communications in order to identify when particular files are being distributed a large number of times, as will be discussed in more detail with reference to FIG. 2.

Figure 2:
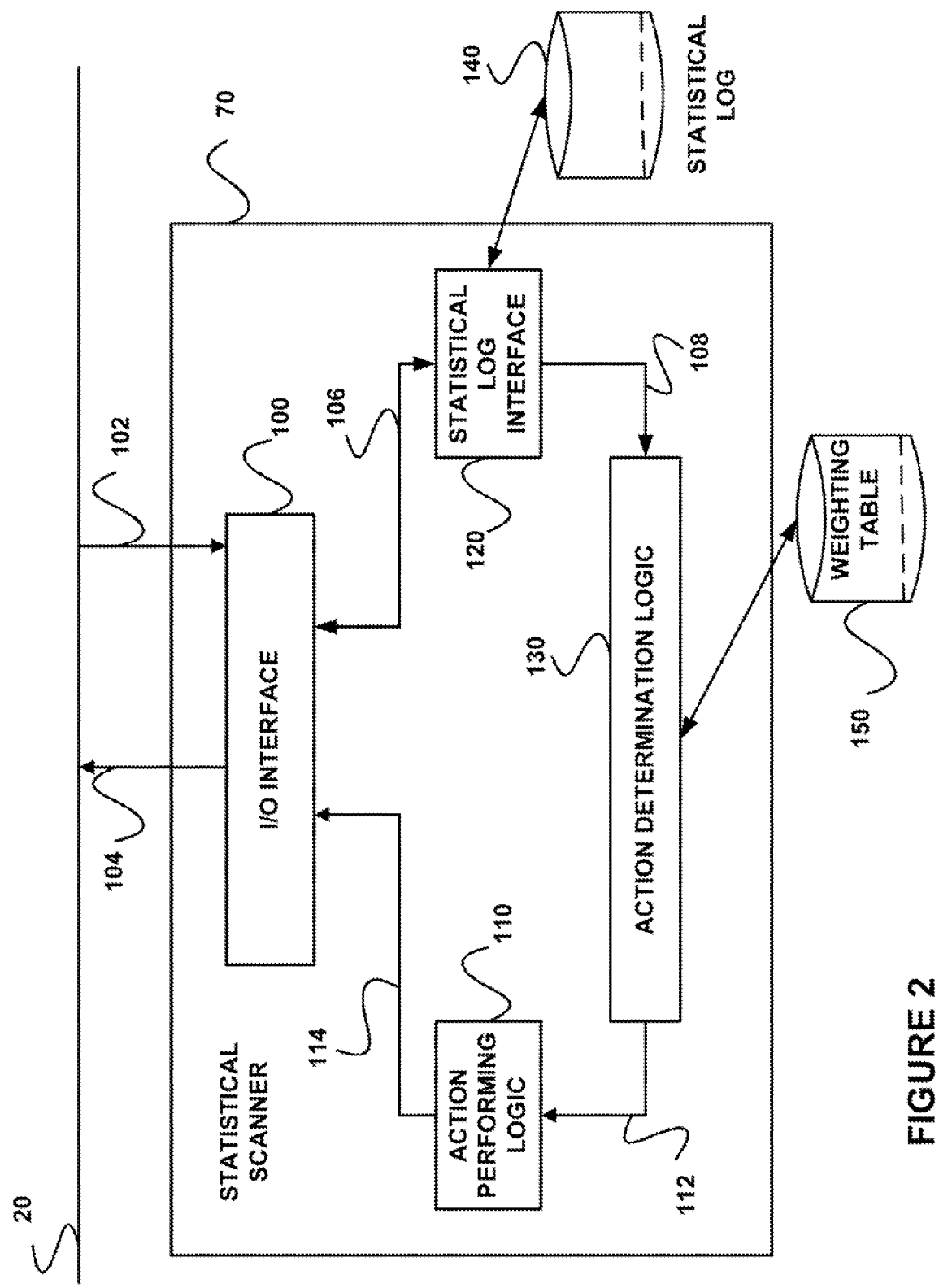
FIG. 2 is a block diagram illustrating in more detail the logical construction of the statistical scanner illustrated in FIG. 1.
Figure 3:
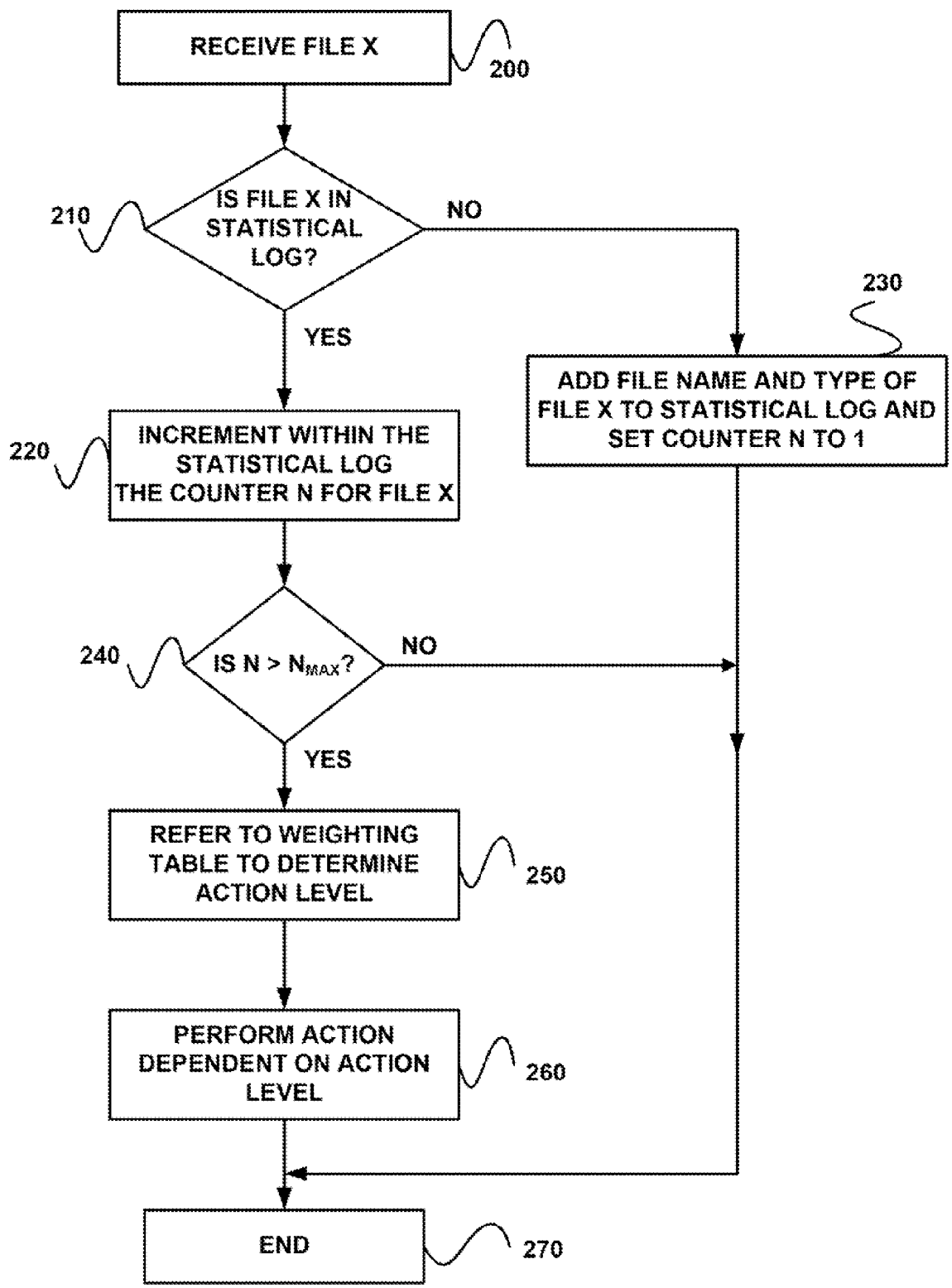
FIG. 3 is a flow diagram illustrating the process performed by the statistical scanner in preferred embodiments of the present invention.

The construction of the statistical scanner 70 in accordance with preferred embodiments is illustrated in FIG. 2, whilst the process performed by that statistical scanner in preferred embodiments is illustrated in FIG. 3. When an e-mail communication is received by the computer network for storage on the file system 30, it will be forwarded to the AV engine 40 and from there to the input/output interface 100 of the statistical scanner 70 over path 102, and will also typically be forwarded on to the compare algorithm scanner 50 and heuristic algorithm scanner 60 as appropriate. Once the file has been received by the input/output interface 100 at step 200, a message is passed over path 106 to the statistical log interface 120. Here, process step 210 is performed, where the statistical log interface 120 references the statistical log 140 to determine whether the received file (hereafter referred to as file X), is already in the statistical log. If file X is not currently in the statistical log, then the process branches to step 230, where the statistical log interface 120 interacts with the statistical log 140 to cause an entry to be made within the statistical log for file X.

An example of the structure of the statistical log of an embodiment of the present invention is given in FIG. 6A. As is apparent from FIG. 6A, the statistical log of that embodiment basically maintains three pieces of information, namely the name of the file, the file type of the file, and a count value identifying the number of occurrences of that file being received by the statistical scanner 70. Accordingly, at step 230, the file name and file type of file X will be added to the statistical log, and the counter N will be initialised to one. The process then proceeds to step 270 where the process ends.

However, if at step 210 it is determined that file X is already within the statistical log, then the process proceeds to step 220, where the statistical log interface 120 interacts with the statistical log 140 to cause the counter N for file X to be incremented. Assuming the statistical log has the construction illustrated in FIG. 6A, then step 220 would typically involve incrementing the relevant counter N by one.

The process then proceeds to step 240, where it is determined whether the counter value N exceeds some predetermined maximum threshold value $N_{MAX}$. If not, then the process proceeds directly to step 270, where the process ends.

However, if at step 240 it is determined that the counter value N does exceed $N_{MAX}$, then the process proceeds to step 250, where the action determination logic 130 is used to reference a weighting table 150 to determine an action level defining an action to be performed in relation to the file.

The format of the weighting table 150 in preferred embodiments of the present invention is illustrated in FIG. 7. The table consists of a list of different file types, with each file type having an associated weighting. In preferred embodiments, the weighting is a numerical value from 1 to 5, with 5 denoting a file type that is most likely to contain serious malware, for example viruses, whereas a weighting of 1 indicates a file type which will not contain such serious malware. It will be appreciated that the file types illustrated in FIG. 7 are not intended to be an exhaustive list, nor are the weighting values necessarily those that would be associated with those file types in practice. In preferred embodiments, the weightings to be associated with particular file types is settable by the system administrator, although it would be typical for the vendor of the statistical scanner to provide some guidance as to suitable weightings for particular file types. Preferably, the weighting table 150 would be external to the statistical scanner 70, and would in preferred embodiments be stored within the file system 30 of FIG. 1. However, it could in certain embodiments be contained internally within the statistical scanner 70, as may be appropriate in embodiments where the weighting table is predefined, and not alterable by the administrator.

Returning to FIGS. 2 and 3, once the action determination logic 130 has determined the appropriate action level/ weighting having regard to the weighting table 150, then a signal is passed over path 112 to the action performing logic 110, where at step 260 the appropriate action is performed dependent on the specified action level. The process then ends at step 270.

It will be appreciated that there are many different actions which could be deemed appropriate dependent on the action level determined at step 250. However, in preferred embodiments, if the weighting, or action level, for a particular file type has a value of 1, as would be the case for .txt and .pdf files if the weighting table of FIG. 7 were used, then such file types are considered to be "safe", to the extent that they will not contain viruses which could affect the integrity of the computer network. In such cases, the action performing logic 110 is preferably arranged to merely notify the administrator that the file in question has been distributed more than the number of times set by the predetermined threshold. This notification is output via the input/output interface 100 over paths 114 and 104 onto the communication infrastructure 20. If the notification takes the form of an e-mail message sent directly to the administrator, then this will be forwarded on to the administrator, who typically may be a user of one of the client devices 10. Alternatively, a separate log could be kept, for example within the file system 30, of all such notifications, and in that event, that log would be updated to reflect the information now being output from the action performing logic 110. As no action is taken in connection with the file itself, the file is merely output by the input/output interface 100 over path 104 for storage within the file system 30.

In preferred embodiments, if the weighting, or action level, is set at a value of 2 or 3, then this is deemed to be at a "caution" level, and in this situation, the action performing logic 110 is arranged to incorporate a warning message into the e-mail communication, and to then output that e-mail communication (with its attached file), for storage in the file system 30. Again, the administrator is notified, either via an e-mail or via amendment of the appropriate log. Such a caution level may, for example, be appropriate to files of type .scr and .doc, where there is a possibility that a virus may be included, but the mere distribution of the file a significant number of times does not necessarily strongly indicate the presence of a virus.

Figure 4:
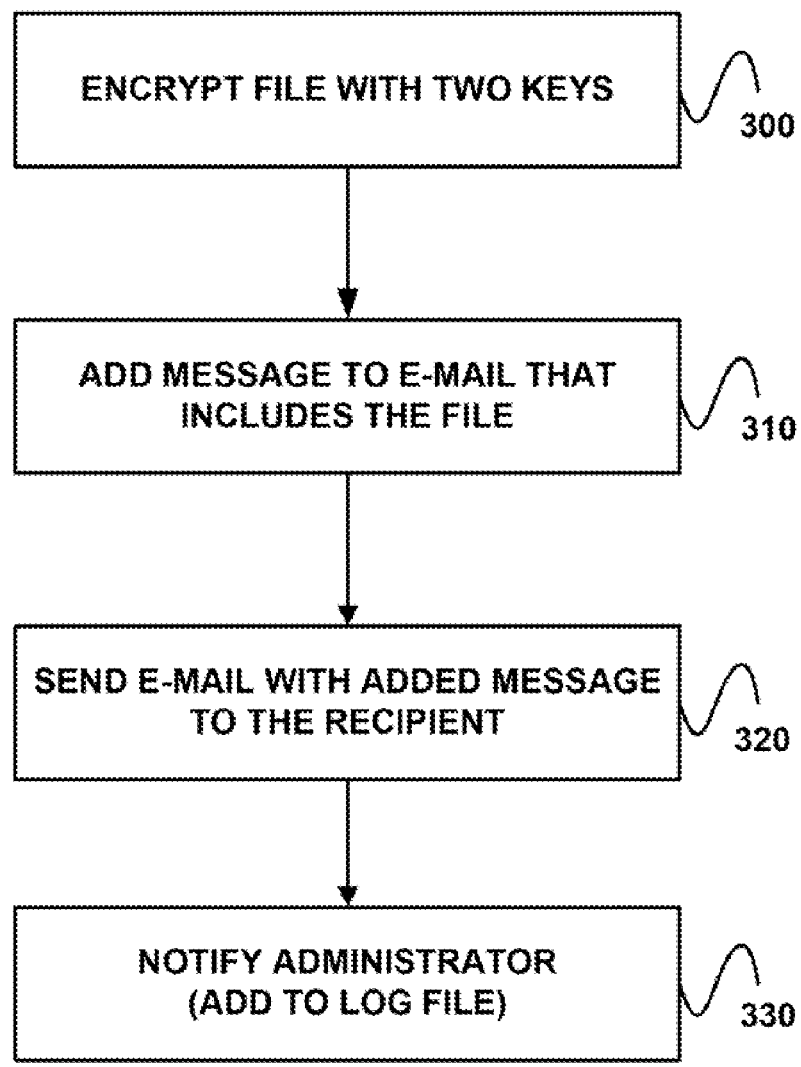
FIG. 4 is a flow diagram illustrating the steps taken by the action performing logic of FIG. 2 in situations where it is determined that a file needs encryption.

If in preferred embodiments the weighting, or action level, is set at a value of 4, then this is deemed to indicate that the file may possibly be infected with a virus, and presents significantly more of a risk than files rated at the caution level. Such a level may, for example, be used for program files of the type .bat, .com, etc. Finally, a weighting, or action level, having a value of 5 is deemed to indicate a file type that is probably infected by a virus when that file has been distributed more times than that indicated by the predetermined threshold, such a rating possibly being appropriate for files of the type .exe, .vbs, etc. The process performed by the action performing logic 110 for files having a weighting of 4 or 5 is illustrated in FIG. 4.

At step 300, the file is encrypted using two keys. This type of encryption will be familiar to those skilled in the art, and hence will not be discussed in detail herein. Typically, there will be a generic key (or company key) for the computer network, and individual keys for each of the users in the organization. For a file having a weighting of 4, that file will preferably be encrypted using the generic key, and the key of the user who sent the e-mail. In the event that the sender of the e-mail was external to the organization, a public user key will be used for such a sender in combination with the generic key. For a file having a weighting of 5, that file will be encrypted using the generic key, and the key of the administrator.

Once the file has been encrypted, a message is added to the e-mail in which the file is included, this message typically being intended to draw the recipient's attention to the fact that the file has been encrypted, and preferably giving the recipient some general instructions about how to proceed. For files having a weighting of 5, the encryption will be such that only the administrator can decrypt the file (only the administrator will have access to the administrator key), and accordingly the message would typically direct the recipient to the administrator. For files having a weighting of 4, in preferred embodiments the encryption used is such that either the administrator or the sender of the e-mail can decrypt the file, and accordingly the message would preferably direct the recipient to either the administrator or the sender. The administrator would have access to the sender's key, or would own a "master key" that could decrypt the file encrypted with the sender's key.

At step 320, the e-mail is then output from the statistical scanner 70 for storage in the file system 30 where the recipient is then able to receive the e-mail along with the message that has been added at step 310. In addition, at step 330, the administrator is notified, as discussed earlier, this typically being via e-mail notification, or by alteration of a log logging such events.

With reference to FIG. 2, it will be appreciated that the statistical log interface 120, the action determination logic 130, and the action performing logic 110, along with any logic internal to the statistical log 140 and weighting table 150 to manage the statistical log and weighting table, could be implemented in a variety of forms. However, in preferred embodiments, each of those elements is preferably embodied by appropriate software code for installation on the AV engine 40.

With reference to FIG. 3, it will be appreciated that the predetermined threshold $N_{MAX}$ could be set at any appropriate level, and would typically be definable for each network in which the statistical scanner is deployed, as an appropriate value would typically depend upon the size of the computer network, the nature of the business being run by the users of that computer network, etc. In preferred embodiments, the value of $N_{MAX}$ is the same for all file types, although it will be appreciated that different values could be set for different file types if desired.

FIG. 6B illustrates an alternative structure of the statistical log 140, where in addition to the file name, file type, and counter, information about the senders of the e-mail containing the particular file are also kept. Hence, by way of example, it can be seen from FIG. 6B that the file name "file 1" has been included in an e-mail sent twelve times by user 1, three times by user 3, and seven times by user 4. Since large scale distribution of a particular file is more likely to be suspicious if it has emanated from a single user, the tracking of this additional information enables the incrementing of the overall counter to be made dependent on this additional user information.

For example, the incrementing could be arranged such that whilst any particular user has sent a file less than or equal to ten times, then the overall counter is incremented by one. However, as soon as the number of occurrences from an individual user exceeds ten, then the overall counter is incremented by some larger value, e.g. two, for each such subsequent occurrence from that user. As can be seen from FIG. 6B, this results in the counter for file 1 now showing a reading of 24 (assuming the last two occurrences are both from user 1), even though only 22 true separate occurrences of the file have occurred. This increase reflects the fact that a significant number of the occurrences of the file are occurring via e-mails sent by user 1, and this represents intrinsically more risk that the file may be malware.

If the statistical log of the format of FIG. 6B were used, then it will be clear that in implementing the process of FIG. 3, the step performed at step 230 for each new file would have to be amended so that the "sender field" and "number of occurrences" fields were also completed. Further, it will be apparent that the incrementing step performed at step 220 would be responsive to the information in the "number of occurrences" field to determine the appropriate amount by which to increment the counter.

Since distribution of malware by e-mail typically involves sending the same file many times over a short period of time, it would generally be appropriate for the statistical log to only keep information for a relatively short period of time. For example, the statistical log could be set as a 24 hour log, keeping track of all e-mail activities within the immediately preceding 24 hours. The log would typically be set up as a rolling log, such that as each individual e-mail occurrence becomes 24 hours old, appropriate decremental adjustments are made to the counter, and to the "number of occurrences" field if a statistical log of the format of FIG. 6B is used.

Preferably, the statistical log would be stored externally to the AV engine, for example within the file system 30.

It will be appreciated that when employing techniques in accordance with preferred embodiments of the present invention, multiple occurrences of the same file may end up being encrypted in the event that those files are of a file type which has a weighting corresponding to "possibly infected" or "probably infected". In determining whether those files are in fact safe, the administrator may apply any number of predetermined tests, his/her own skill and judgement, etc, or may alternatively pass the file to some third party, for example an anti-virus vendor, for some tests to be performed. If it is subsequently determined that the file is safe, then it is clear that there will be a significant number of files to decrypt.

Figure 5:
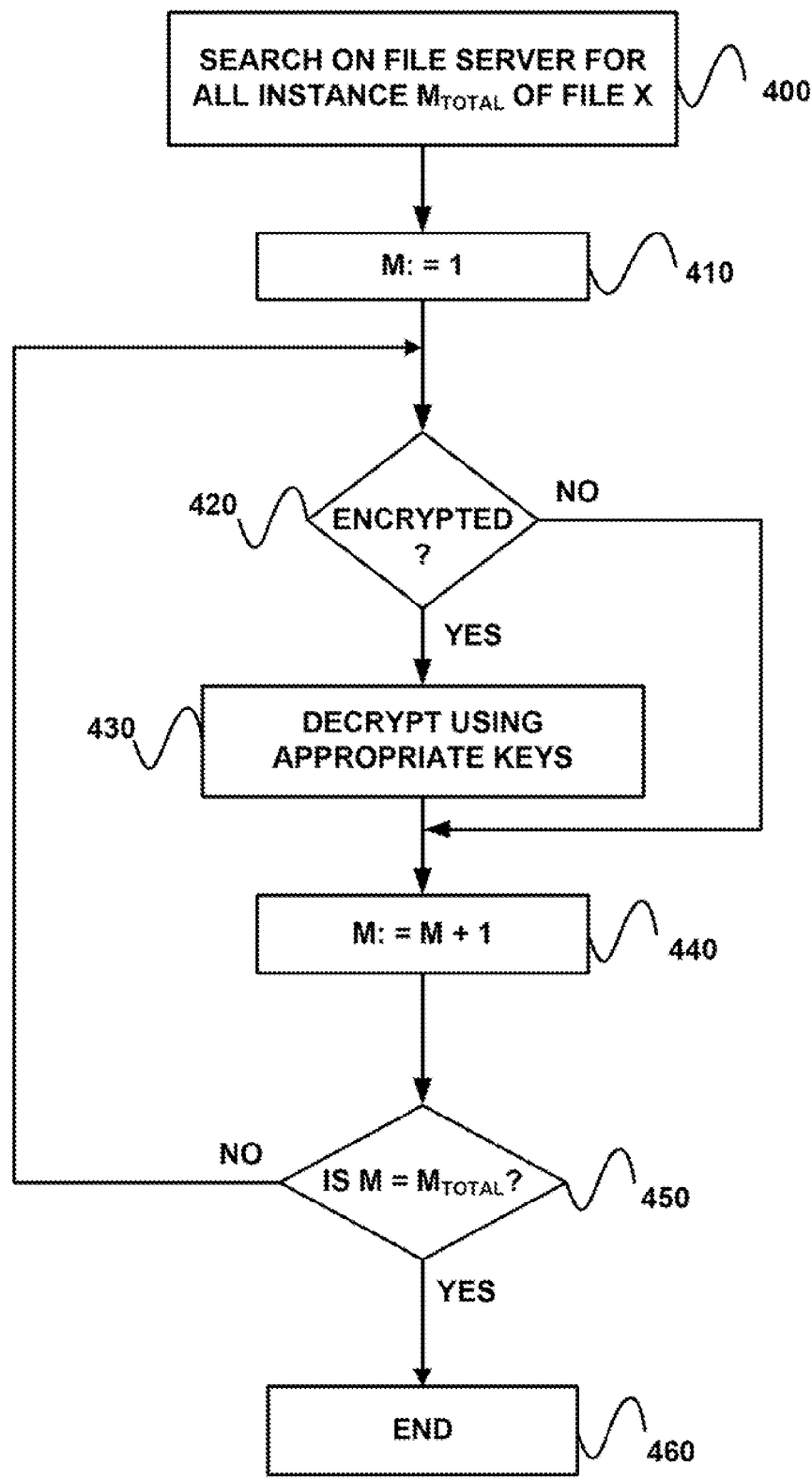
FIG. 5 is a flow diagram illustrating an automated decryption process that may be performed in accordance with preferred embodiment of the present invention in situations where an encrypted file is subsequently determined to be safe.

In accordance with preferred embodiments of the present invention, an automatic decryption routine is preferably provided which can be installed on an appropriate device, for example the device 10 of the administrator, for automatically retrieving the encrypted files from the file system 30, decrypting them, and then returning them to the file system 30. Alternatively, the automatic decryption routine could be installed on the file system 30. The process performed by such decryption software is illustrated in FIG. 5.

At step 400, a search of the file system 30 is performed to identify all instances ($M_{TOTAL}$) of the file in question, here identified as file X. Then at step 410 a parameter M is set equal to 1, after which the process proceeds to step 420, where it is determined whether the Mth occurrence of the file is encrypted. If not, the process proceeds directly to step 440, whereas if the file is encrypted the process proceeds first to step 430, where the file is decrypted using the appropriate keys. Decryption processes will be familiar to those skilled in the art, and hence will not be discussed in more detail herein.

At step 440, the value of the parameter M is incremented by 1, after which it is determined at step 450 whether M equals $M_{TOTAL}$. If not, the process returns to step 420 to determine whether the Mth occurrence of the file (identified by the new value of M) is encrypted, with the resulting processes being performed dependent on that analysis. When at step 450 it is determined that M does now equal $M_{TOTAL}$, then the process proceeds to step 460, where the process ends.

Although particular embodiments have been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

We claim:

1. A computer program product embodied on a tangible computer readable medium for operating a computer to review files for potential malware, comprising:
   logging code operable to maintain a statistical log having an entry for each file sent to the computer for review, each entry being arranged to store a count value indicating the number of times that the file has been sent to the computer for review and a value of one or more predetermined attributes relating to the file;
   weighting table code operable to maintain a weighting table identifying, for each value of said one or more predetermined attributes, a weighting indicating the likelihood that a file having that value of said one or more predetermined attributes will be malware;
   statistical log interface code operable, upon receipt of a file, to determine with reference to the statistical log the count value relating to that file;
   action determination code operable, if the count value determined by the statistical log interface code exceeds a predetermined threshold, to reference the weighting table to determine the weighting to be associated with the file, based on the value of said one or more predetermined attributes associated with that file in the statistical log; and
   action performing code operable to perform predetermined actions in relation to the file dependent on the weighting determined by said action determination code.

2. A computer program product as claimed in claim 1, wherein said one or more predetermined attributes comprise an indication of the file type of the file.

3. A computer program product as claimed in claim 1, wherein if the weighting indicates that the file is probably malware, said action performing code is operable to perform the steps of:
   (i) encrypting the file such that only an administrator can decrypt that file; and
   (ii) generating for access by an administrator a notification identifying that the file has been encrypted.

4. A computer program product as claimed in claim 3, wherein the action performing code is further operable to associate a message with the file for reference by a person receiving that file, the message identifying that the file has been encrypted.

5. A computer program product as claimed in claim 1, wherein if the weighting indicates that the file is possibly malware, said action performing code is operable to perform the steps of:
   (i) encrypting the file such that only an administrator or the originator of the file can decrypt that file; and
   (ii) generating for access by an administrator a notification identifying that the file has been encrypted.

6. A computer program product as claimed in claim 5, wherein the action performing code is further operable to associate a message with the file for reference by a person receiving that file, the message identifying that the file has been encrypted.

7. A computer program product as claimed in claim 1, wherein if the weighting indicates that the file is to be treated with caution, said action performing code is operable to perform the steps of:
   (i) associating a warning message with the file for reference by a person receiving that file; and
   (ii) generating for access by an administrator a notification identifying the file.

8. A computer program product as claimed in claim 1, wherein if the weighting indicates that the file is safe, said action performing code is operable to generate for access by an administrator a notification identifying the file.

9. A computer program product as claimed in claim 1, wherein if it is determined that a file sent to the computer is not currently entered in the statistical log, the logging code is further operable to create an entry in the statistical log for the file, in which the value of said one or more predetermined attributes relating to the file are stored, and in which the count value is initialised.

10. A computer program product as claimed in claim 1, wherein upon receipt of a file, the statistical log interface code is operable to cause the count value within the relevant entry of the statistical log to be incremented to account for the current occurrence of the file.

11. A computer program product as claimed in claim 1, wherein the computer is arranged to review files included in e-mail communications, and each entry in the statistical log is further arranged to identify, for each sender of that file, the number of times that that sender has sent the file in addition to the count value indicating the total number of times that the file has been sent.

12. A computer program product as claimed in claim 11, wherein upon receipt of a file, the statistical log interface code is operable to cause the count value within the relevant entry of the statistical log to be incremented to account for the current occurrence of the file, and the number by which the count value is incremented is dependent on the number of times that the sender of the current occurrence of the file has previously sent that file.

13. A computer program product as claimed in claim 1, wherein if said action performing code is arranged, dependent on the weighting, to encrypt the file, the computer program product further comprises:
   automated decryption code operable, if the file is subsequently determined to be safe, to perform the steps of:
   (i) locating all encrypted occurrences of that file on a file system; and
   (ii) decrypting each said occurrence.

14. A method of operating a computer to review files for potential malware, comprising the steps of:
   (a) maintaining a statistical log having an entry for each file sent to the computer for review, each entry being arranged to store a count value indicating the number of times that the file has been sent to the computer for review and a value of one or more predetermined attributes relating to the file;
   (b) maintaining a weighting table identifying, for each value of said one or more predetermined attributes, a weighting indicating the likelihood that a file having that value of said one or more predetermined attributes will be malware;
   (c) upon receipt of a file, determining with reference to the statistical log the count value relating to that file;
   (d) if the count value determined at said step (c) exceeds a predetermined threshold, referencing the weighting table to determine the weighting to be associated with the file, based on the value of said one or more predetermined attributes associated with that file in the statistical log; and
   (e) performing predetermined actions in relation to the file dependent on the weighting determined at said step (d).

15. A method as claimed in claim 14, wherein said one or more predetermined attributes comprise an indication of the file type of the file.

16. A method as claimed in claim 14, wherein if the weighting indicates that the file is probably malware, said step (e) comprises the steps of:
(i) encrypting the file such that only an administrator can decrypt that file; and
(ii) generating for access by an administrator a notification identifying that the file has been encrypted.

17. A method as claimed in claim 16, further comprising the step of associating a message with the file for reference by a person receiving that file, the message identifying that the file has been encrypted.

18. A method as claimed in claim 14, wherein if the weighting indicates that the file is possibly malware, said step (e) comprises the steps of:
(i) encrypting the file such that only an administrator or the originator of the file can decrypt that file; and
(ii) generating for access by an administrator a notification identifying that the file has been encrypted.

19. A method as claimed in claim 18, further comprising the step of associating a message with the file for reference by a person receiving that file, the message identifying that the file has been encrypted.

20. A method as claimed in claim 14, wherein if the weighting indicates that the file is to be treated with caution, said step (e) comprises the steps of:
(i) associating a warning message with the file for reference by a person receiving that file; and
(ii) generating for access by an administrator a notification identifying the file.

21. A method as claimed in claim 14, wherein if the weighting indicates that the file is safe, said step (e) comprises the step of generating for access by an administrator a notification identifying the file.

22. A method as claimed in claim 14, wherein if at said step (c) it is determined that the file is not currently entered in the statistical log, the method further comprises the step of creating an entry in the statistical log for the file, in which the value of said one or more predetermined attributes relating to the file are stored, and in which the count value is initialised.

23. A method as claimed in claim 14, wherein said step (c) includes the step of incrementing within the statistical log the count value to account for the current occurrence of the file.

24. A method as claimed in claim 14, wherein the computer is arranged to review files included in e-mail communications, and each entry in the statistical log is further arranged to identify, for each sender of that file, the number of times that that sender has sent the file in addition to the count value indicating the total number of times that the file has been sent.

25. A method as claimed in claim 24, wherein said step (c) includes the step of incrementing within the statistical log the count value to account for the current occurrence of the file, and the number by which the count value is incremented is dependent on the number of times that the sender of the current occurrence of the file has previously sent that file.

26. A method as claimed in claim 14, wherein if at said step (e), the file is encrypted, the method further comprises, if the file is subsequently determined to be safe, the automated steps of:
locating all encrypted occurrences of that file on a file system; and
decrypting each said occurrence.

27. A data processing apparatus including a tangible computer readable medium for reviewing files for potential malware, comprising:

logging logic operable to maintain a statistical log having an entry for each file sent to the computer for review, each entry being arranged to store a count value indicating the number of times that the file has been sent to the computer for review and a value of one or more predetermined attributes relating to the file;
weighting table logic operable to maintain a weighting table identifying, for each value of said one or more predetermined attributes, a weighting indicating the likelihood that a file having that value of said one or more predetermined attributes will be malware;
statistical log interface logic operable, upon receipt of a file, to determine with reference to the statistical log the count value relating to that file;
action determination logic operable, if the count value determined by the statistical log interface logic exceeds a predetermined threshold, to reference the weighting table to determine the weighting to be associated with the file, based on the value of said one or more predetermined attributes associated with that file in the statistical log; and
action performing logic operable to perform predetermined actions in relation to the file dependent on the weighting determined by said action determination logic.

28. A data processing apparatus as claimed in claim 27, wherein said one or more predetermined attributes comprise an indication of the file type of the file.

29. A data processing apparatus as claimed in claim 27, wherein if the weighting indicates that the file is probably malware, said action performing logic is operable to perform the steps of:
(i) encrypting the file such that only an administrator can decrypt that file; and
(ii) generating for access by an administrator a notification identifying that the file has been encrypted.

30. A data processing apparatus as claimed in claim 29, wherein the action performing logic is further operable to associate a message with the file for reference by a person receiving that file, the message identifying that the file has been encrypted.

31. A data processing apparatus as claimed in claim 27, wherein if the weighting indicates that the file is possibly malware, said action performing logic is operable to perform the steps of:
(i) encrypting the file such that only an administrator or the originator of the file can decrypt that file; and
(ii) generating for access by an administrator a notification identifying that the file has been encrypted.

32. A data processing apparatus as claimed in claim 31, wherein the action performing logic is further operable to associate a message with the file for reference by a person receiving that file, the message identifying that the file has been encrypted.

33. A data processing apparatus as claimed in claim 27, wherein if the weighting indicates that the file is to be treated with caution, said action performing logic is operable to perform the steps of:
(i) associating a warning message with the file for reference by a person receiving that file; and
(ii) generating for access by an administrator a notification identifying the file.

34. A data processing apparatus as claimed in claim 27, wherein if the weighting indicates that the file is safe, said action performing logic is operable to generate for access by an administrator a notification identifying the file.

35. A data processing apparatus as claimed in claim 27, wherein if it is determined that a file sent to the computer is not currently entered in the statistical log, the logging logic is further operable to create an entry in the statistical log for the file, in which the value of said one or more predetermined attributes relating to the file are stored, and in which the count value is initialised.

36. A data processing apparatus as claimed in claim 27, wherein upon receipt of a file, the statistical log interface logic is operable to cause the count value within the relevant entry of the statistical log to be incremented to account for the current occurrence of the file.

37. A data processing apparatus as claimed in claim 27, wherein the computer is arranged to review files included in e-mail communications, and each entry in the statistical log is further arranged to identify, for each sender of that file, the number of times that that sender has sent the file in addition to the count value indicating the total number of times that the file has been sent.

38. A data processing apparatus as claimed in claim 37, wherein upon receipt of a file, the statistical log interface logic is operable to cause the count value within the relevant entry of the statistical log to be incremented to account for the current occurrence of the file, and the number by which the count value is incremented is dependent on the number of times that the sender of the current occurrence of the file has previously sent that file.

39. A data processing apparatus as claimed in claim 27, wherein if said action performing logic is arranged, dependent on the weighting, to encrypt the file, the data processing apparatus further comprises:

automated decryption logic operable, if the file is subsequently determined to be safe, to perform the steps of:
(i) locating all encrypted occurrences of that file on a file system; and
(ii) decrypting each said occurrence.

* * * * *